United States Patent [19]
Cole

[11] Patent Number: 5,125,943
[45] Date of Patent: Jun. 30, 1992

[54] COMBINED BATCH AND CULLET PREHEATER WITH SEPARATION AND REMIXING

[75] Inventor: William E. Cole, Sudbury, Mass.

[73] Assignee: Gas Research Institute, Chicago, Ill.

[21] Appl. No.: 563,266

[22] Filed: Aug. 6, 1990

[51] Int. Cl.$^5$ .................................................. C03B 3/02
[52] U.S. Cl. .......................................... 65/27; 65/28; 432/96; 432/100
[58] Field of Search ................. 65/27, 28; 432/95, 96, 432/97, 98, 99, 100, 101; 110/245; 165/104.16; 55/1, 52, 459.1

[56] References Cited

U.S. PATENT DOCUMENTS 4,747,452 5/1988 Engström et al. .......................... 55/1
4,875,919 10/1989 De Saro et al. .......................... 65/25

*Primary Examiner*—Richard V. Fisher
*Assistant Examiner*—John M. Hoffmann
*Attorney, Agent, or Firm*—Lorusso & Loud

[57] ABSTRACT

An improved method preheating cullet and glass batch together for use as feedstock for a glass furnace. The method uses a preheater including a separator and a heat exchanger. The heat exchanger is a direct contact raining bed in which large particles in the feedstock are heated by hot gases as the particles flow down by gravity and fine particles become entrained with the hot gas flow. The separator removes the fine particles entrained in the hot gases and remixes preheated the fine particles with the preheated cullet. Preheater systems are described in which the hot gasses are provided by the glass furnace exhaust, by a separately fired heater, by a separately fired heater combined with the glass furnace exhaust and by a separately fired heater with exhaust gas recirculation.

9 Claims, 4 Drawing Sheets

COMBINED BATCH AND CULLET PREHEATER WITH SEPARATION AND REMIXING

BACKGROUND OF THE INVENTION

This invention relates to glass manufacture, and in particular, to preheating of cullet and glass batch utilized as a feedstock in a glass furnace.

Glass manufacturing is an energy-intensive process which requires about five-million Btu/ton for the melting process alone. As of the early 1980's, 300,000 billion Btu were consumed annually by the glass industry in the United States, with natural gas providing 70% of this energy. In a typical glass furnace, the heat supplied to the melt is provided predominantly by natural gas mixed with preheated combustion air. The resultant flame fires over the melt and heat is transferred to the melt by radiation from the flame and furnace enclosure.

Additionally, some furnaces augment the heat with an electric boost. The major attraction of a electric boost is that it allows an increase in production from an existing furnace by providing an additional heat source to the melt. Typically, for a container furnace (a glass furnace for manufacturing bottles), an equivalent of 1200 kW or more can be added directly into the glass furnace by boosting, which yields a production increase of 20%.

In addition to energy costs, another significant factor in glass manufacturing is the cost of the constituents which are melted to form the glass. Traditionally, glass batch composed of compounds including $Na_2Co_3$, $CaCo_3$, and $SiO_2$ is used to form glass. In recent years, the glass industry has been able to reduce this part of the cost by supplementing the traditional glass batch constituents with recycled glass, commonly referred to as cullet. The cullet is obtained from sources such as recycled bottles, which are broken up into practical sizes for use as glass forming constituents.

At present, the maximum amount of glass that can be pulled from a furnace is limited by the amount of energy that can be put into the furnace to melt the feedstock. This limit is reached when the furnace is at high fire resulting in maximum flow of the products of combustion.

A method of increasing the amount of heat that can be added to a furnace while avoiding the high operating cost of an electric boost is to preheat the feedstock- i.e. the glass batch and the cullet. Preheating the batch and the cullet separately has proven feasible. However, there is a need for a preheater that can preheat both the cullet and the glass batch together.

As indicated above, additional energy can be put into the furnace by preheating the glass batch and cullet so as to provide a more productive and efficient glass manufacturing process. One suggested method of preheating the cullet and glass batch is that of a fluidized bed preheater. A problem with this type of preheater is that the glass forming mixture contains large particles with a wide size distribution. The high cost to grind these large particles to a consistent, workable distribution for use in a fluidized bed makes this process unattractive.

Another method of preheating the starting materials is taught in U.S. Pat. No. 4,374,660, Fluidized Bed Glass Batch Preheater, issued to Sakhuja et. al.. The Sakhuja patent teaches a system for heating starting materials for glass melting and means for separating the lighter particles entrained in the hot gases and reintroducing them to the heated starting materials. The Sakhuja patent has the disadvantage of requiring two different heating systems the cullet is preheated using a packed bed and the glass batch is preheated with a fluid bed arrangement. Also, as mentioned above, the cullet could not be combined with the glass batch into the fluid bed without grinding the cullet beforehand.

Additionally, combining the cullet and the glass batch in the packed bed has the problems of any packed bed system. A substantial disadvantage of packed bed heating is that the heating gas tends to carve out a path for itself through the bed of material resulting in an uneven temperature distribution. Also, the high temperature drop across a packed bed would require the use of a substantial amount of auxiliary power to direct gases through the materials. In addition, a very high residence time is required to heat the materials to the desired temperature.

U.S. Pat. No. 4,875,919, entitled "Direct Contact Raining Bed Counterflow Cullet Preheater and Method for Using Same", by Desaro et. al., whose disclosure is incorporated herein by this reference to that patent, describes a system which can efficiently preheat the larger particles in the feedstock, typically the cullet, without the disadvantages of either packed or fluid bed preheater systems. However, the system described in this patent cannot preheat the combined feedstock without preparing the glass batch into pellets.

Without this preparation, the fine particles in the feedstock, typically glass batch, become entrained in the hot gas and flow out the top of the preheater. Thus, some of the glass batch is the wasted and the glass batch that does get preheated may be of the wrong composition to form glass. A separate preheater could be used for the glass batch but this would be less desirable than a single preheater In short, the glass industry is in need of a simple, cost-effective system, by which it can increase the productivity of furnaces by preheating cullet and glass batch feedstock together prior to the melting process.

Therefore, it is an object of the present invention to provide a means by which existing glass furnaces can be made more productive and energy efficient.

A further object of the present invention is to overcome known production limitations of glass furnaces by delivering more energy to the furnace through glass forming mixture preheating.

Another object of the invention is to provide an improved method and apparatus for preheating the glass forming mixture, cullet and glass batch feedstock, for use in a glass furnace.

SUMMARY OF THE INVENTION

In accordance with the present invention the above-noted problems of the prior art are overcome by a preheater system which employs a direct contact raining bed heat exchanger and a separator to preheat material including cullet and glass batch prior to its use as feedstock in a glass melting operation. In the system of the present invention unheated material including cullet and glass batch is introduced at one end of a raining bed heat exchanger while heated gas is introduced at the other end counter to the flow of the materials. In a preferred embodiment of the invention, baffles are included in the heat exchanger to direct the flow of cullet and of the hot gases for optimum heat transfer.

The large particles in the material flow by gravity down the heat exchanger and are heated by the counterflowing gas to a desired temperature. The fine particles in the material are entrained in the gas flow and move cocurrently with the gases to the top of the heat exchanger. The fine particles are separated from the hot gas in the separator and are combined with the large particles at the exit end of the heat exchanger. The remixed preheated material is then fed to a furnace.

The system of the present invention allows both the cullet and glass batch to be preheated together. Additionally, the present invention provides a very even heating distribution to a wide range of particle sizes while preventing loss of fine particles and yields a proper composition of glass batch. Finally, the present invention offers the further advantage of lower energy costs because the preheater and the furnace has a higher thermal efficiency than the furnace alone.

DESCRIPTION OF THE PREFERRED EMBODIMENTS

At the outset the invention is described in its broadest overall aspects with a more detailed description following. The broadest aspects of the invention include preheating the large particles of the glass forming mixture in a direct contact raining bed counterflow heating chamber, entraining the fine particles in the hot gas, separating the fine particles from the hot gas, remixing the heated fine particles, with the heated large particles, together called feedstock, and immediately passing the preheated feedstock to a furnace for the forming of glass.

At nominal operation, the maximum size of the fine particles that become entrained in the hot gases is about 700 microns; the minimum size of the large particles that fall counter to the hot gases is about 200 microns. This means particles about 200 microns and smaller are fine particles, particles between about 200 microns and about 700 microns may be either fine particles or large particles, and particles larger than about 700 microns are large particles. The minimum large particle size and the maximum fine particle size depends on the velocity of the gas flow. As the hot gases' velocity increases the minimum large particle size and the maximum fine particle size increases.

The feedstock can be preheated one of three ways. The feedstock can be heated by the products of combustion of a separately fired heater, by utilizing flue gas from the glass melting furnace, or by a combination of both combustion and flue gas.

A key feature in the preheater of the present invention is the use of a separator to separate the hot gas and the fine particles, typically small glass batch particles. The separator allows the small glass batch particles and cullet to be preheated in the same heat exchanger. The fine particles become entrained in the hot gases and flow along with the hot gases to the separator. The preferred embodiment of the preheater uses a cyclone separator available commercially to separate the hot gas and the fine particles particularly a high performance cyclone separator which separates the entrained fine particles quickly and efficiently from the gas flow. Previous raining bed preheaters could only preheat the cullet which typically consists of relatively large particles.

This invention uses a raining bed heat exchanger. In a raining bed heat exchanger, constituents to be preheated are continually fed into the top of the heat exchanger chamber and, driven by the force of gravity, are allowed to fall through the heat exchanger, counter to the flow of hot gases introduced at or near the bottom of the chamber. After falling through the chamber and being remixed with the heated fine particles, the feedstock is fed into the furnace or furnace feeder. It is important that the feedstock arrive at the furnace while it is still hot. Thus, the preheater feedstock outlet should be as close to the furnace doghouse (feeder) as possible.

Figure 1:
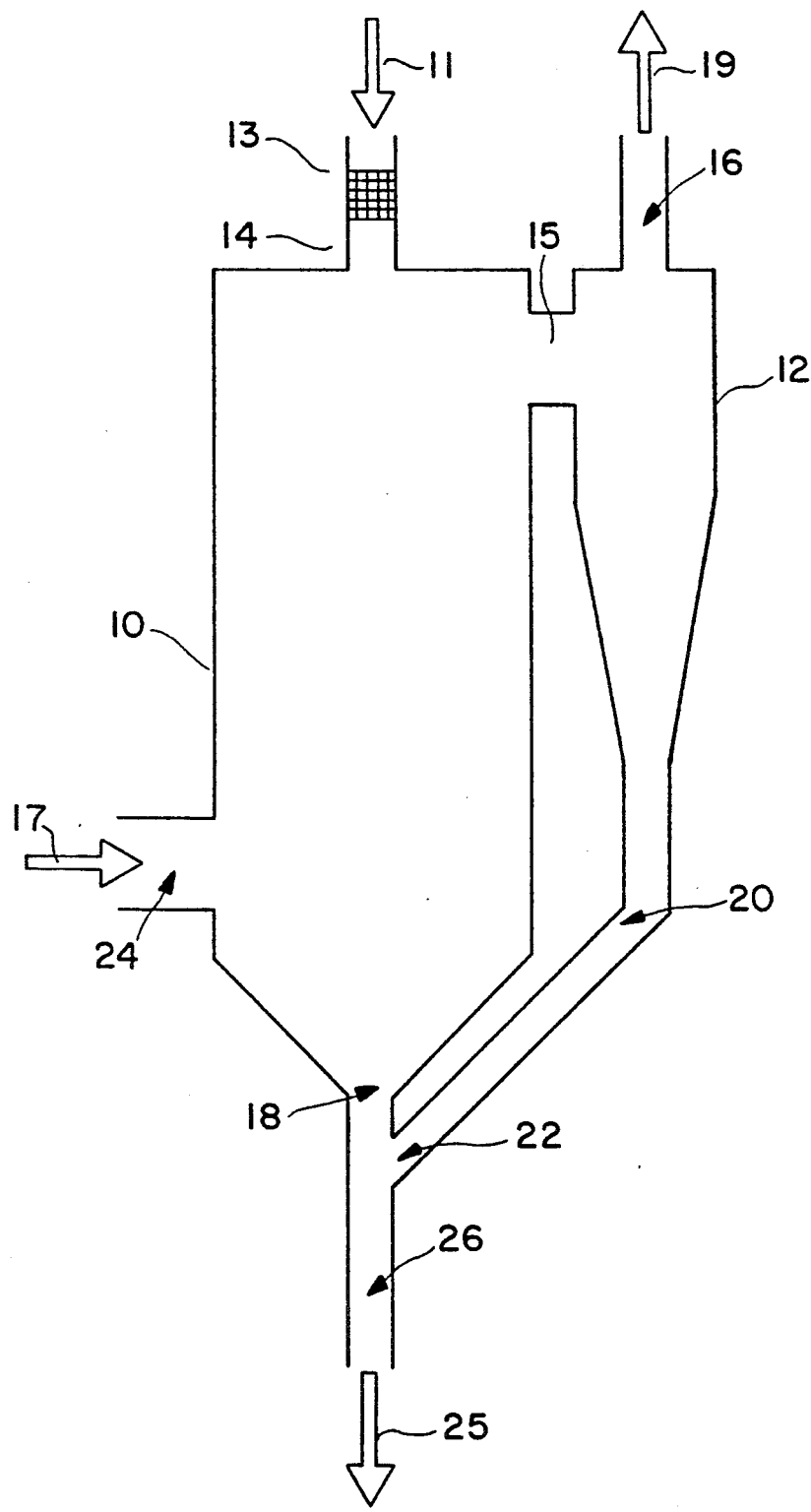
FIG. 1 is a diagrammatic view of a separately fired combined cullet and glass batch preheater in accordance with the present invention.

One important embodiment of the preheater of the present invention is shown in FIG. 1 in which a heat exchanger 10 is located adjacent to a cyclone separator 12. Unheated mixed feedstock of cullet and glass batch is fed in the direction of arrow 11 as a vibratory feeder 13 positioned near the top of the heat exchanger 10, through an opening 14 and into the heat exchanger 10. The feeder 13 provides a seal to prevent exhaust gases from passing out of the heat exchanger through the feeder 13.

The large particles in the feedstock are heated as they flow down the heat exchanger by the hot gas fed into heat exchanger 10 in direction of arrow 17 that flows up from opening 24 at the bottom of the heat exchanger 10. After heating, the larger particles fall by gravity through opening 18 to mix with heated small particles.

The fine particles become entrained in the hot gas as it flows upwards and are heated in a parallel upwards flow. The fine particles entrained in the hot gas flow through opening 15, located near the top of the heat exchanger 10, to a cyclone separator 12. The cyclone separator 12 separates the fine particles from the hot gas. After separation, the fine particles go through opening 22 to mix with the heated large particles. The cold gas now flows in direction of arrow 19 out the opening 16 on top of the cyclone separator 12. Finally, the heated feedstock is introduced into a furnace containing molten glass in direction of arrow 25.

Figure 2:
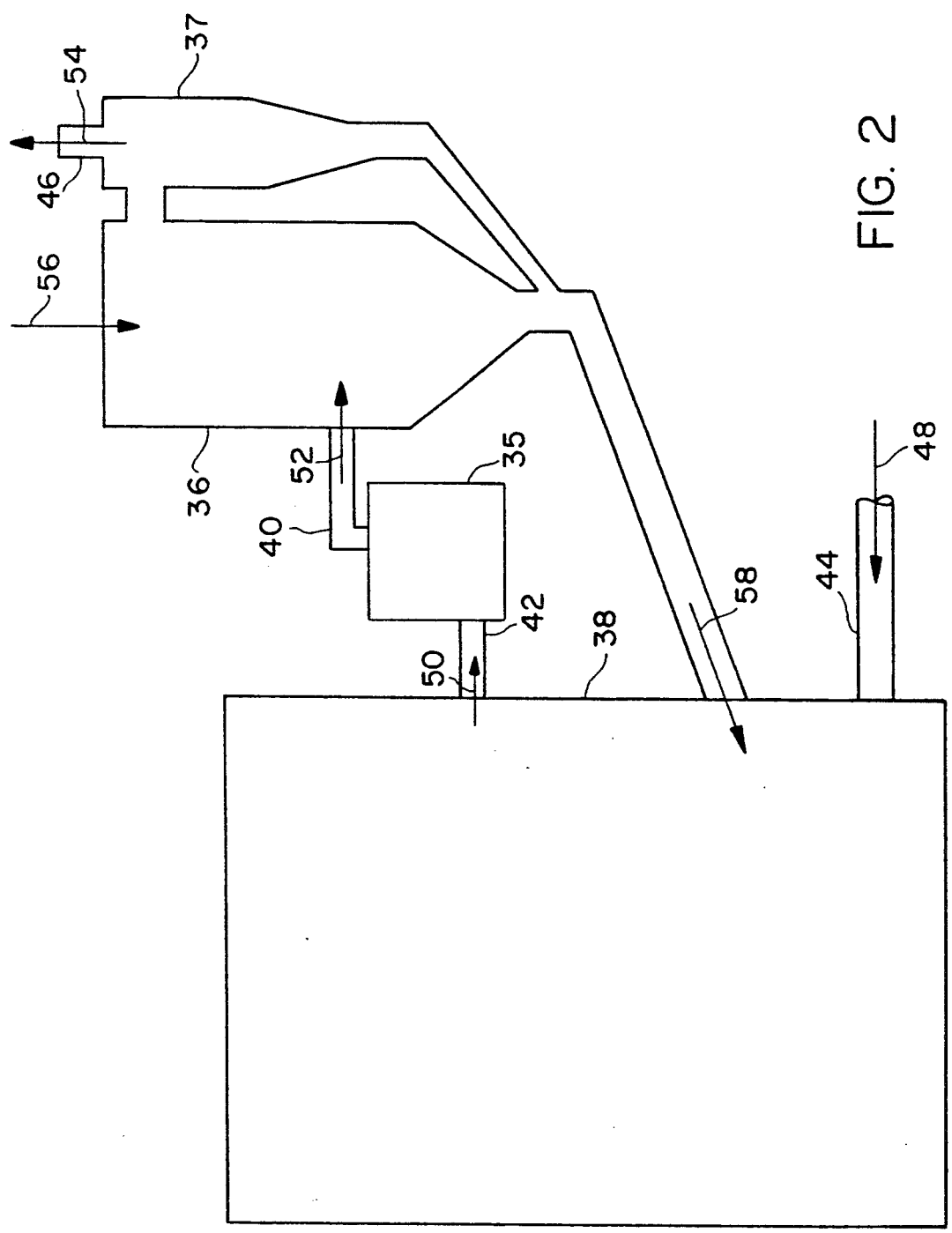
FIG. 2 is a diagrammatic view of an alternate form of the system of the present invention in which flue gas from a glass melting furnace is used to preheat cullet and glass batch.

While the preferred embodiment of the present invention is a direct gas fired unit, alternative flue gas configurations are possible and may be superior under certain operating conditions. In one such possible alternative embodiment shown in FIG. 2, flue gas from the melting process is used to preheat the feedstock, preferably after the flue gases have decreased in temperature by passage through a regenerator 35. The heat exchanger 36 and cyclone separator 37 function similarly to the preheater unit in FIG. 1 except that the hot gas which enters the heat exchanger 36 through duct 40 in the direction of arrow 52 to heat the cold feedstock entering the heat exchanger 36 in the direction of arrow 56 is flue gas which has come from the glass melting furnace 38 in the direction of arrow 50 through duct 42 and by so doing utilizes energy to preheat the feedstock that otherwise might have been wasted. Typical flue gas temperatures (after passage through a regenerator) are 1000° F. which can produce feedstock preheat of about 700° F. In accordance with the present invention, depending on the preheater gas heating method, the preheated feedstock that will enter the glass melting furnace 38 in the direction of arrow 58 can be preheated to a temperature between about 700° F. and that at which it begins to agglomerate which is about 1150° F. In the system of FIG. 2 products of combustion gas are introduced to the glass melting furnace 38 in the direction of arrow 48 through inlet port 44 and, after passing through the glass melting furnace 38, the regenerator 35, the heat exchanger 36 and the separator 37 the gases are exhausted in the direction of arrow 54 through exhaust port 46 in the separator 37.

Figure 3:
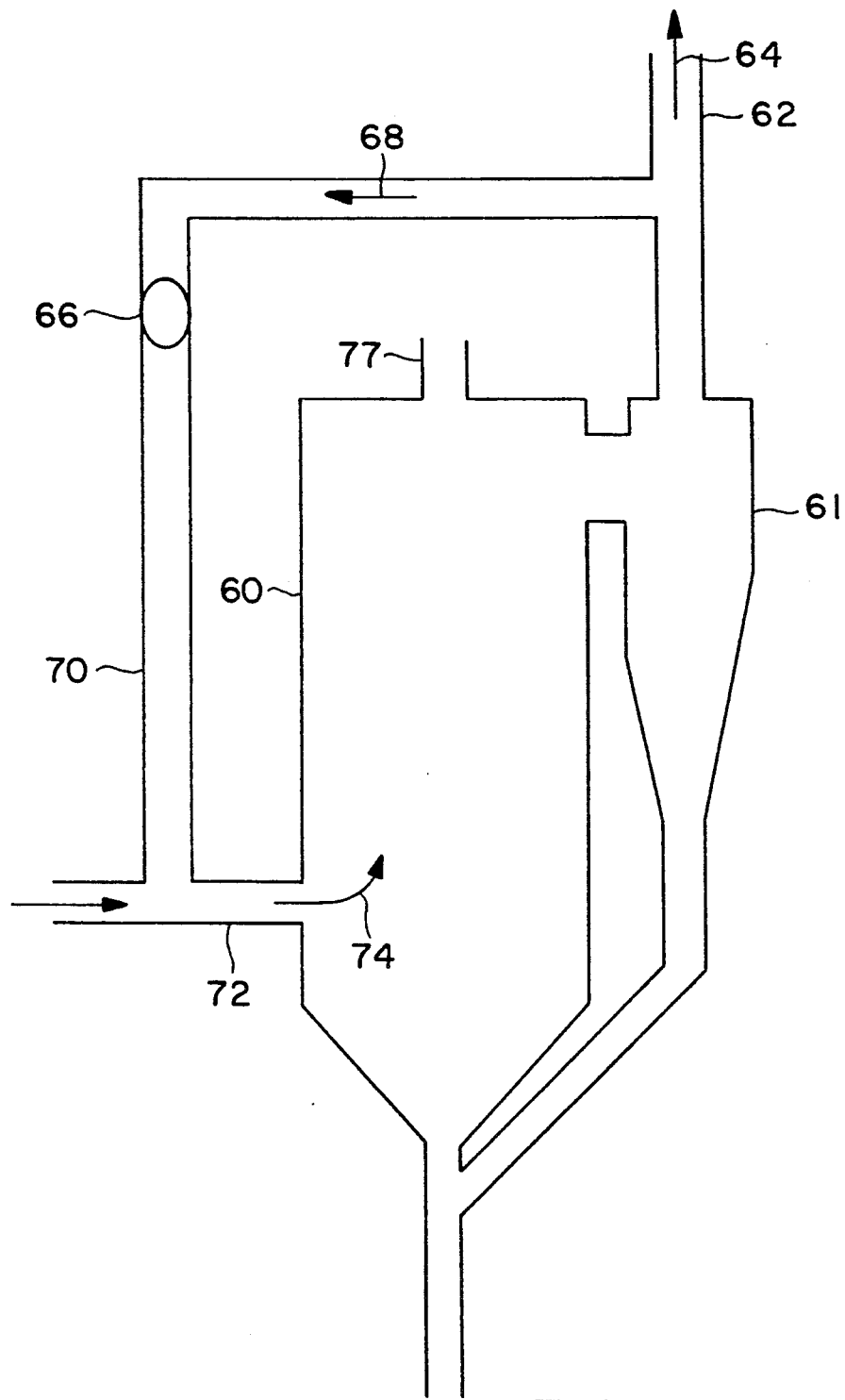
FIG. 3 is a diagrammatic view of an alternate form of the system of the present invention in which a portion of the preheater exhaust gas is recirculated.

Another energy conserving alternative embodiment of the present invention, illustrated in FIG. 3, includes a gas 1 recirculation duct 70 on the separator 61 and heat exchanger 60 to allow a portion of the separator exhaust gas to rejoin with the combustion gas at the bottom of the chamber. In this configuration, when the combustion gas has reached the top of the separator 61 only part of it is exhausted in the direction of arrow 64 through exhaust port 62. A portion of the gas is drawn by fan or other suction device such as an ejector 66 in the direction of arrow 68 into the recirculation line 70 where it is mixed with combustion ga and fed through inlet port 72 back into the heat exchanger in the direction of arrow 74. The system is able to reclaim energy that would otherwise be wasted.

Figure 4:
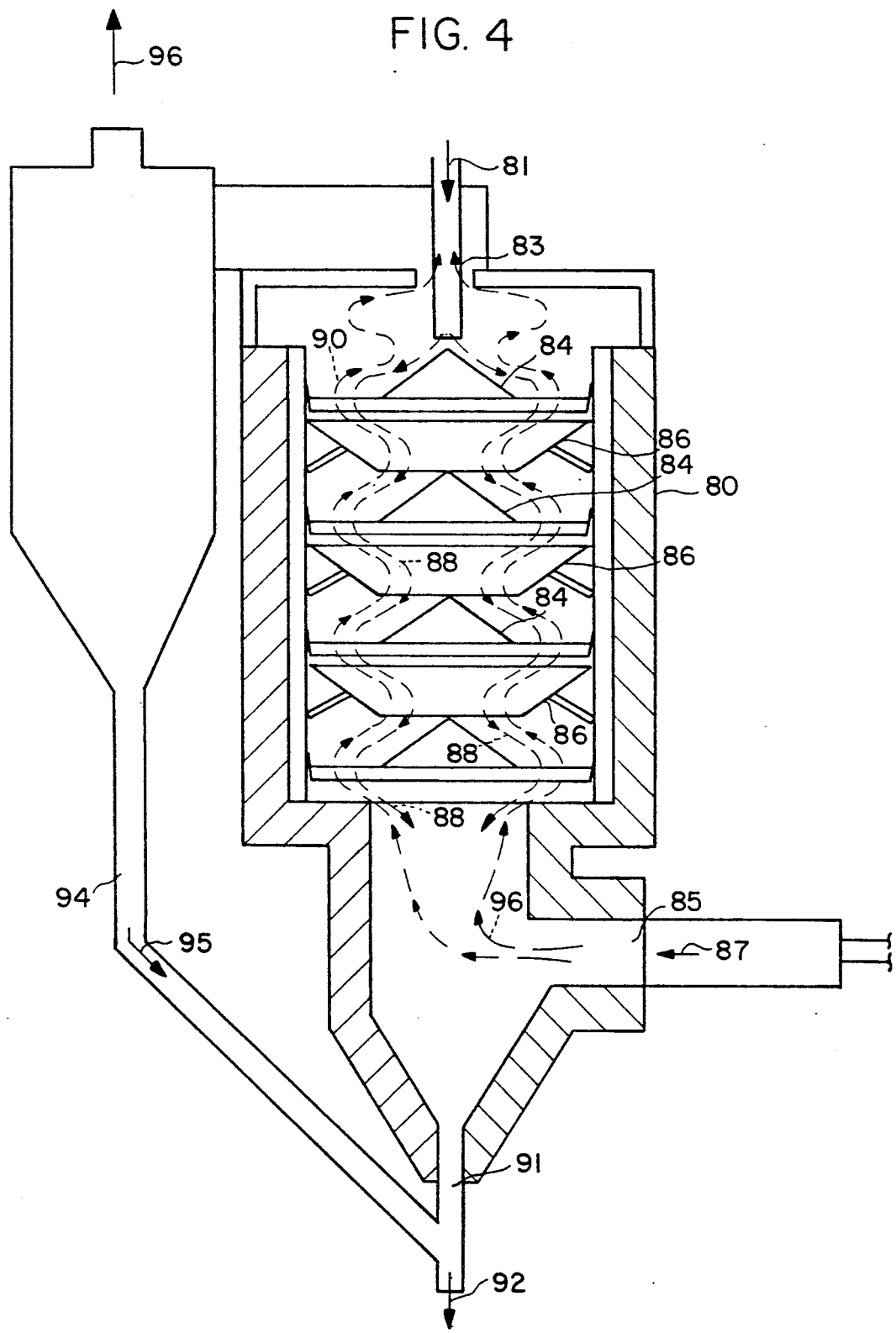
FIG. 4 is a diagrammatic view of a preferred embodiment of the system of the present invention in which baffles are used in the heat exchanger.

A preferred embodiment of the preheater of the present invention is shown in FIG. 4. The heat exchanger 80 and cyclone separator 82 function similarly to that shown in FIG. 1 except the heat exchanger 80 includes baffles to direct the flow of cullet and hot gas so that there is contact between them to assist the transfer of heat. Those skilled in the art will realize that various arrangements of baffles will function to optimize the heat transfer. The preheater of the present invention shown in FIG. 4 includes assemblies of hat baffles 84 and funnel baffles 86. As the cold feedstock enters the heat exchanger 80 in the direction of arrow 81 through opening 83, it contacts the hot gas flowing upward from its entrance to the heat exchanger from opening 85 in the direction of arrow 87. The hat baffles 84 are able to direct the downwardly falling cullet in the direction of arrows 88 in counterflow to the direction of the combustion gases indicated by arrows 90. This configuration improves the heat transfer between the gases and the cullet. The heated cullet falls through duct 91 in the direction of arrow 92 to mix with the preheated fine particles and travels to the glass melting furnace (not shown). The fine particles falling by gravity become entrained in the hot gases traveling in direction of arrows 90 through opening 83 and pass to the cyclone separator 82, which separates the fine particles from the hot gas. After separation the fine particles flow by gravity through a duct 94 to join with the preheated cullet and proceed to the furnace in the direction of arrow 95. The exhaust gases exit the cyclone separator 82 in the direction of arrow 96.

The invention is further described by the following non-limiting example. With reference to FIG. 1, combustion gas at a temperature of 1650° F. and a flow rate of 54,000 cubic feet per hour is introduced to heat exchanger 10 trough inlet port 24. At the same time feedstock is introduced into opening 14 at a rate of 2.5 tons/- hour while exhaust gas flows out the opening 16 on the top of the separator 12 at the rate of 54,000 cubic feet per hour.

The large particles of the glass forming mixture fall through the heat exchanger 10 over a period of 4 seconds during which the solids are heated to approximately 700° F. The fine particles of the glass-forming mixture become entrained in the combustion gas and flow to the separator 12 through opening 15, then separate from the hot gases (which exhaust from the cyclone separator through opening 16) and fall through opening 22. Upon leaving the heat exchanger through opening 18 the large particles are mixed with the fine particles flowing through opening 22 and flow to the furnace through opening 26. The temperature inside the furnace is generally between 2600° F. and 2900° F. depending on the specific type of glass being produced at the time. Depending on the production requirements of the operation, glass forming constituents are fed into the furnace at a rate about fifteen percent greater than that at which molten glass is removed. for the forming of suitable products such as bottles. Generally, a "pool" of molten glass of about 5 ¼ feet deep is left in the furnace at all times. The furnace is fired primarily by combustion gas at the rate of 882,000 cubic feet per hour.

The invention may be embodied in other specific forms without departing from the spirit or essential characteristics thereof. The present embodiments are, therefore, to be considered in all respects to be illustrative and not restrictive, the scope of the invention being indicated by the claims rather than the foregoing description and all changes which come within the meaning and range of equivalency of the claims are therefore intended to be embraced therein.

What is claimed is:

1. A method of preheating glass constituents for use in a glass furnace comprising:
    (a) mixing glass batch with cullet to form a glass forming mixture having large and fine particles;
    (b) introducing the glass forming mixture near the top of a heat exchanger;
    (c) allowing large particles in said glass forming mixture to fall downward through the heat exchanger while hot gases flowing countercurrent to the fall of the large particles, said hot gases being introduced under conditions so that the temperature of the large particles in the heat exchanger is below the agglomeration temperature of said glass forming mixture, said flow of hot gases also heating the fine particles and causing the fine particles to be entrained in the hot gases and flow cocurrently with the flow of the hot gases to a separator;
    (d) separating the heated fine particles from the hot gases and delivering the heated fine particles to the heated large particles to form a mixture of heated large particles and heated fine particles; and
    (e) introducing the mixture of heated large particles and heated fine particles into a glass furnace.

2. The method as set forth in claim 1 wherein the heated fine particles are separated from the hot gases by a high performance cyclone separator.

3. The method as set forth in claim 1 wherein the residence time of large particles in the heat exchanger is controlled by deterring the large particles fall through the heat exchanger with a series of deflectors arranged within the heat exchanger;

4. The method as set forth in claim 1 wherein the hot gases comprises heated combustion gas products from direct firing combustion gas introduced into the heat exchanger.

5. The method as set forth in claim 1 wherein the hot gases comprises heated flue gas from the furnace introduced into the heat exchanger.

6. The method as set forth in claim 1 wherein the hot gases comprises a heated combination of combustion products of a separately fired heater and furnace flue gas introduced into the heat exchanger.

7. The method as set forth in claim 1 wherein the hot gases comprises heated recirculating preheater exhaust gas along with combustion products of a separately-fired heater introduced into the heat exchanger.

8. The method as set forth in claim 1 wherein the glass forming mixture in step (b) is introduced into a heat exchanger having deflectors within designed to retard the passage of the large particles traveling from the top of the heat exchanger to the bottom in order to provide residence time in the heat exchanger sufficient for the large particles to reach a desired temperature.

9. The method as set forth in claim 1 wherein the glass forming mixture is continually fed into the heat exchanger to provide a raining bed of large particles.

* * * * *